United States Patent Office 3,551,876
Patented Dec. 29, 1970

3,551,876
WIREWAYS AND CONNECTOR CLAMPS
Gerard S. Walter, Pittsburgh, Pa., assignor to Walter Electrical Manufacturing Company, Pittsburgh, Pa.
Filed Apr. 17, 1968, Ser. No. 721,954
Int. Cl. H01r 7/08
U.S. Cl. 339—21                                    14 Claims

ABSTRACT OF THE DISCLOSURE

There is disclosed an electrical wireway comprising at least one fixed elongated conductor, means for mounting said conductor in electrically isolated relationship on said wireway, at least one electrically conductive connector for said conductor, means for slidably and electrically engaging said connector with said conductor for movement therealong, and means for securing an electrical cable to said connector. In other arrangements of my invention, the electrical cable is secured generally between the connector and conductor for direct electrical contact with the wireway conductor. In the latter arrangement such securance desirably terminates potential sliding movement between the connector and the conductor.

---

The present application relates to electrical wireways and connectors therefor, sometimes referred to as "bug" connectors, and, more particularly, to such connectors slidably mounted on the wireways. My invention especially contemplates wireways and connectors movable therealong for installation in a wiring trough.

In the installation of electrical wiring troughs and other wireways, it is usually necessary to accommodate three or more very heavy electrical cables to form a main or entrance circuit through the wireway. Conventional wiring troughs for this purpose are provided in the form of elongated metal boxes into which one or more insulated connection blocks are installed depending upon the number of branch circuits connected to the wiring trough. The aforementioned heavy electric cables and similar branch cables must be connected to the insulated junction blocks in electric parallel.

The confines of the junction blocks, and wireways and other space limitations usually associated with a typical electrical entrance, impose severe space limitations that render the heavy electrical cables difficult to manipulate for installational purposes, while maintaining the requisite electrical isolation. Moreover, cables must be completely insulated throughout their lengths, save for limited bared portion at the take-offs for each branch circuit. The aforementioned connection blocks, which are installed at the bared portions, usually comprise three or more bug connectors each of which must accommodate at least two bared cable portions, from which the insulation must be stripped by the electrician. The three or more bug connectors for a given branch circuit must be maintained in spaced isolation as by the insulated frame work of the junction block. The manner of laying the main cables along the length of the wiring trough makes this necessary, as the cables are not otherwise fixed or separated save by their engagement with the bug connector.

Frequently, the connection blocks are omitted entirely and a branch take-off from the main cables is effected merely by the use of three or more independent bug connectors. In this type of installation each bug connector together with the bared cable portions clamped thereby must be separately insulated by completely wrapping with electrician's tape. This is a time-consuming practice. Moreover, the tape frequently is not wrapped with sufficient layers to provide proper electrical isolation. Often the wrappings become loosened with age. These possibilities impose considerable hazards where applicable codes permit the installation of a wiring trough without a disconnect between the wiring trough and the entrance mast. The trough cables and connectors then remain "hot" at all times.

The bulkiness of the aforementioned junction blocks and the connectors contained impose space limitations which increase the required distance between adjacent branch or take-off circuits and thus require the use of a longer wiring trough than is desirable. Similarly, the use of wrapped connectors without an insulating junction block require staggering the connectors along the main cables to permit sufficient room for the electrician to apply the insulating tape. The length of wiring trough is undesirably increased in either case.

I overcome these disadvantages of the prior art by providing an electrical wireway having permanently installed, isolated conductors thereon. Desirably the wireway is in the form of a wiring trough and the permanent conductors can be affixed to the bottom thereof to extend substantially along its length. The conductors are bare to facilitate electrical connection therewith but are affixed to an insulating member to maintain their spaced and electrically isolated relation to one another and to the wiring trough which is usually made of metal. With this arrangement, I obviate the necessity of the electrician's straightening and installation of very heavy electrical cables, or mains in the conventional trough. The electrician's work is further simplified by eliminating the necessity of stripping conventionally insulated electrical cables in order to make branch connections thereto.

Each of the permanent trough conductors is shaped for engagement with one or more electrical conductors, which can be readily installed at any point along the length of the permanent conductor. As the trough conductors are mounted in a permanent, spaced relation and as each connector and conductor is provided with means for preserving a predetermined attitude of the connector relative to its conductor, my novel connectors are likewise maintained in spaced relation and in electrical isolation although mounted side-by-side on adjacent trough conductors. Thus, the necessity for using either an insulated junction block or staggered tape-wrapped connectors in a conventional wiring trough is likewise obviated together with the considerable time and difficulty of using either of these conventional approaches. Similarly, my invention permits branch take-offs to be positioned much closer together along the length of a wiring trough, with the result that the trough can be considerably shortened particularly where a large number of branch circuits must be accommodated.

In one arrangement of my invention, I facilitate the joining of my novel connectors to my novel wireway arrangement by shaping one or both of the connectors and conductors to provide a snap-in engagement between each wireway conductor and the one or more connectors that may be secured thereto. Thus, until each connector is tightened it may be slid along the length of the wireway conductor while engaged thereto. Desirably, also the snap-in feature is arranged to preserve a predetermined attitude, for example an upright position, of each connector relative to its associated conductor for proper electrical isolation of the connectors.

In other arrangements of my invention both a connector and a conductor of my novel wireway or wiring trough can be shaped to enclose the bared end of a conventional electrical branch or entrance cable therebetween. Most importantly, with my arrangement it is usually necessary to secure only a single cable end to each connector—a paramount advantage when aluminum cables are used and a time-saving feature in any case.

I am aware of the U.S. pats to Hassler, 2,207,860; Tornblom, 2,358,946; Zifferer, 1,392,810 and Wilson, 2,786,885, all of which relate to means for securing a conductive rail or other conductor to a fixed support. However, each of these patents relates to a supporting bracket or the like which is affixed both to the conductor and to the fixed support. None of the cited patents shows an electrical connector that is movable to any position along the length of its associated conductor. There is no disclosure of a connector which can be snap-engaged with a permanently installed conductor of a wiring trough or other wireway. Other novel features of my invention likewise are not shown in the prior art.

I accomplish these desirable results by providing an electrical wireway comprising at least one fixed elongated conductor, means for mounting said conductor in electrically isolated relationship on said wireway, at least one electrically conductive connector for said conductor, means for slidably and electrically engaging said connector with said conductor for movement therealong, and means for securing an electrical cable to said connector.

I also desirably provide an electrical wireway comprising at least one fixed elongated conductor, means for mounting said conductor in electrically isolated relationship on said wireway, a connector slidably engageable with said conductor for movement therealong, and means for securing an electrical cable generally between said connector and said conductor in electrically conductive relationship with at least said conductor.

I also desirably provide a similar wireway wherein said cable securing means include means for affixing said connector to said conductor in termination of said sliding movement upon operation of said securing means.

I also desirably provide a similar wireway wherein said co-operating means are formed on said connector and on said conductor for effecting a snap-engagement therebetween.

I also desirably provide a similar wireway wherein a number of said conductors are affixed to said isolating means in spaced isolation relative to one another, and at least two connectors are secured respectively to an adjacent pair of said conductors, said slidable engagement positioning each of said connectors in a given attitude with respect to said conductors so that said connectors cannot physically contact one another.

During the foregoing discussion, various objects, features and advantages of the invention have been set forth. These and other objects, features and advantages of the invention together with structural details thereof will be elaborated upon during the forthcoming description of certain presently preferred embodiments of the invention and presently preferred methods of practicing the same.

In the accompanying drawings I have shown certain presently preferred embodiments of the invention and have illustrated certain presently preferred methods of practicing the same, wherein:

FIG. 4 is a cross sectional view of the apparatus as shown in FIG. 2 and taken along reference line IV—IV thereof.

Figure 1:
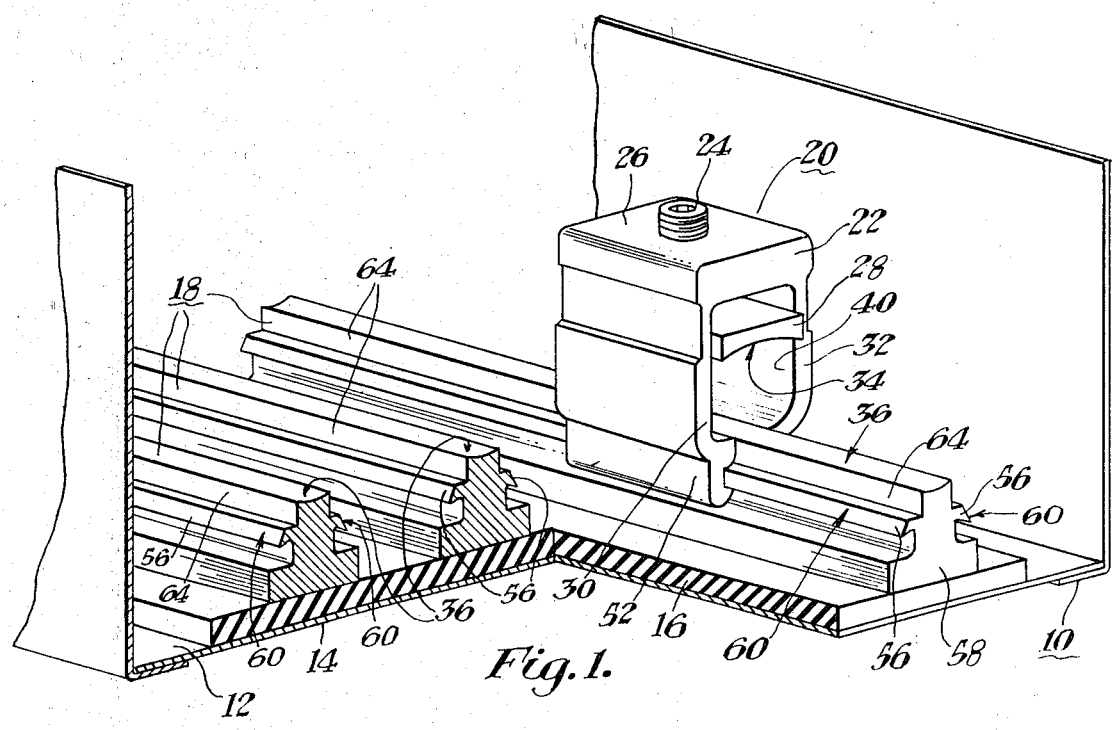
FIG. 1 is a partial isometric view, partially broken away and other parts omitted, of one form of wireway arranged in accordance with my invention.

Referring now more particularly to the drawings and initially to FIG. 1 thereof, my novel wireway 10 is provided with a support structure denoted generally by the reference character 12. To the bottom wall 14 of the support 12 an insulating member 16 is affixed. The insulator 16 desirably coextends with a plurality of permanent conductors 18 which are affixed to the insulating member 16 in spaced relation so as to maintain electrical isolation from one another, and from the walls of the support 12 if the latter be conductive. In accordance with most practices, to walls of the support 12 including its bottom wall 14 are usually fabricated from a structural metal such as sheet steel. The conductors 18 can be secured to the insulating member 16 and the latter to the bottom wall 14 of the trough 12, for example in the manner depicted in FIG. 4 and discussed below.

One or more connectors, of either insulating or preferably conductive material, can be secured to each conductor 18. In this arrangement, connector 20 is a generally inverted U-shaped member 22 having a clamping screw 24 extending through a threaded aperture in its bight portion 26. As better shown in FIGS. 4 and 5 the lower end of the clamping screw 24 is rotatably connected to clamp 28 which desirably extends substantially along the width of the U-shaped member 22 as better shown in FIGS. 2 and 3. The clamp 28 bridges the distance between the depending legs 30 and 32 of the U-shaped member 22.

The lower surface 34 of the clamping member 28 is rounded (FIGS. 1, 4 and 5), and the uppermost surface 36 of each conductor 18 has a similar concave configuration, which desirably coextends with the conductor 18. As better shown in FIG. 5, a second conductor, such as a bared cable end 38, is secured between the rounded surface of the clamp 28 and the concave surface 36 of the conductor 18. Depending upon the clamping force applied by means of the clamp screw 24 more or less of the inner wall surfaces 40 of the U-shaped member 22 will be engaged by the cable end 38.

As the cable 38 is secured in direct electrical contact with the conductor 18, the connector 20 can be made of insulating material, if desired. Generally, it is preferable to fabricate the connector 20 entirely from conductive material to increase the effective area of electrical contact between the bared cable end 38 and the wireway 10. It is also contemplated that the connector 20, when made of conductive material, can be provided with conventional cable securance means for engaging the cable end 38 solely with the connector 20. Means described below are provided for slidably and electrically engaging the connector 20 with one of the bare conductors 18 for movement therealong.

Figure 2:
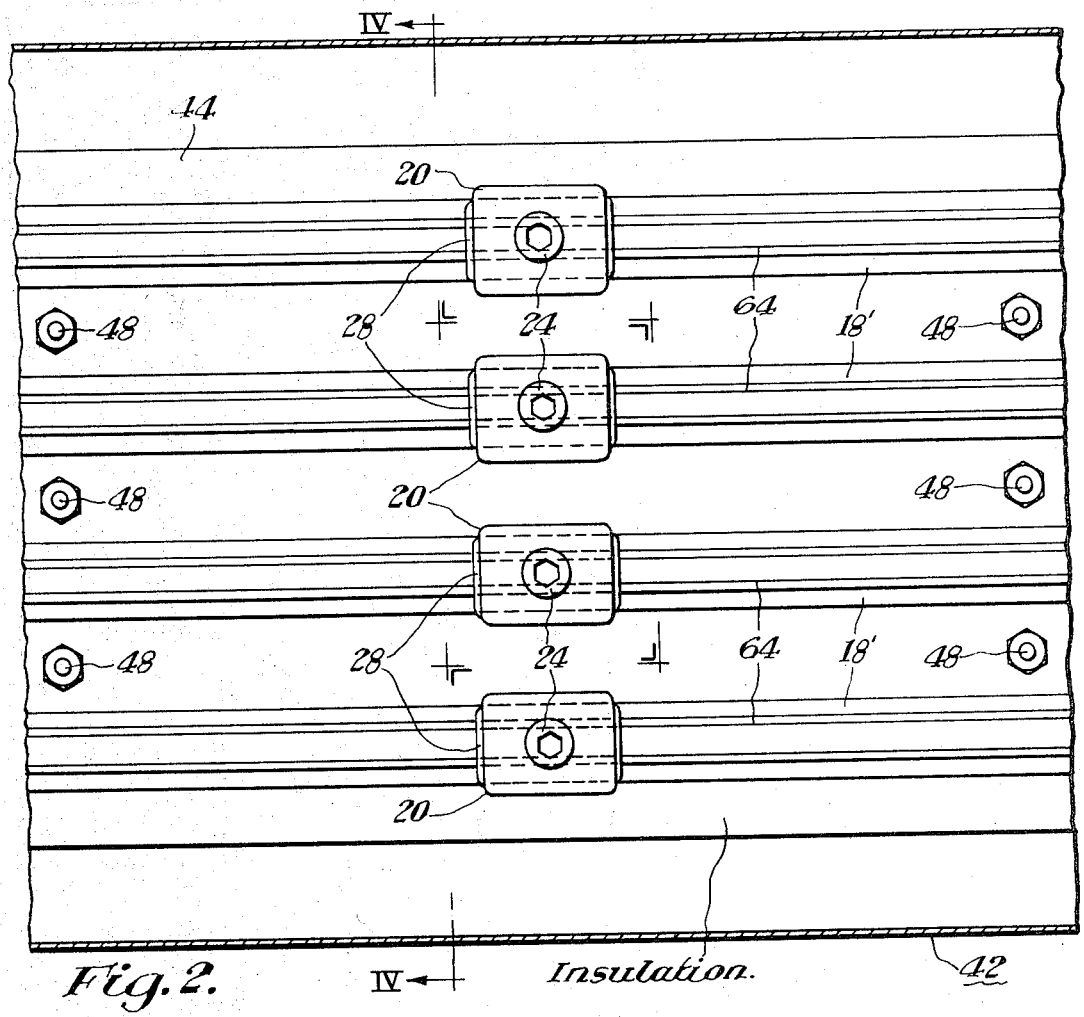
FIG. 2 is a top plan view of a wiring trough arranged in accordance with my invention.
Figure 3:
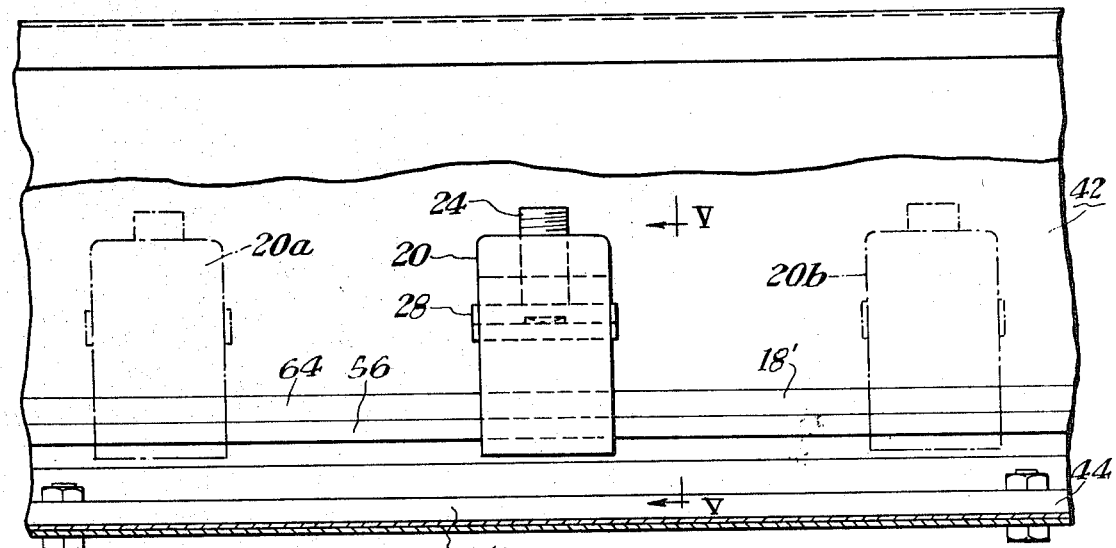
FIG. 3 is an elevational view of the apparatus as shown in FIG. 2, with parts thereof broken away.

Although three such conductors 18 are illustrated in FIG. 1 of the drawings it will be obvious that a different number can be employed depending upon the application of the invention. For example, in FIGS. 2-4 a wiring trough 42 is illustrated in which four such conductors 18' are mounted. The conductors 18' of FIGS. 2-4 are likewise electrically isolated from one another and in furtherance of this purpose can be secured to a mounting and insulating block or strip 44 by means of recessed screws 46 as better shown in FIG. 4. The insulator 44 in turn can be bolted as denoted by reference characters 48 or otherwise secured to the bottom wall 50 of the trough 42. With this arrangement the bare stationary conductors 18' are electrically isolated from one another and also from the wiring trough 50 and the bolts or other fasteners 48 employed to mount the insulating member thereon.

As better shown in FIGS. 2 and 4 the conductors 18' are sufficiently spaced that connectors 20, when made of conductive material and secured thereto, are maintained in spaced electrical isolation although mounted side-by-side, i.e., in a row extending transversely of the wireway 10 or 42. This eliminates taping and staggering the connectors 20 or the conventional use of a bulky insulating junction block within the trough or wireway. With the arrangement shown, take-offs for branch circuits can be more closely spaced, as denoted by chain outlines 20a or 20b in FIG. 3, to minimize the length of the trough or wireway.

The numbers of the stationary conductors 18 or 18' can be varied from the examples shown to provide electric circuits other than the two phase circuit of FIG. 1 (assuming a ground conductor) and the three phase circuit of FIGS. 2-4. Similarly, a branch circuit need not be joined to all of the conductors of a given wireway. For example, a pair of connectors 20 coupled respectively to a single "hot" conductor and a ground conductor can be used to provide a single phase branch circuit. However, the aforementioned space considerations are applicable as such single phase connectors do not require a junction block nor staggering laterally of the wiring trough to permit taping.

The aforementioned sliding engagement facilitates positioning the connectors 20 at a desired point along the conductors 18 for branch take-offs. Means are provided for initially slidably engaging each connector 20 with its associated stationary conductor 18. Desirably, such means are arranged for a snap-engagement so that one or more of such connectors 20 can be installed along the length of each conductor 18 and readily moved to their location before installation of the bared ends of the branch or incoming cables. Desirably, the snap-engagement means are further arranged so that the slidability of the connector 20 is terminated at the same time that a bared cable end 38 is secured between the connector 20 and the stationary conductor 18. It will be apparent, of course, that spatial provision can be made in the trough of wireway for slipping the connector 20 over the ends of the associated conductors 18.

Figure 5:
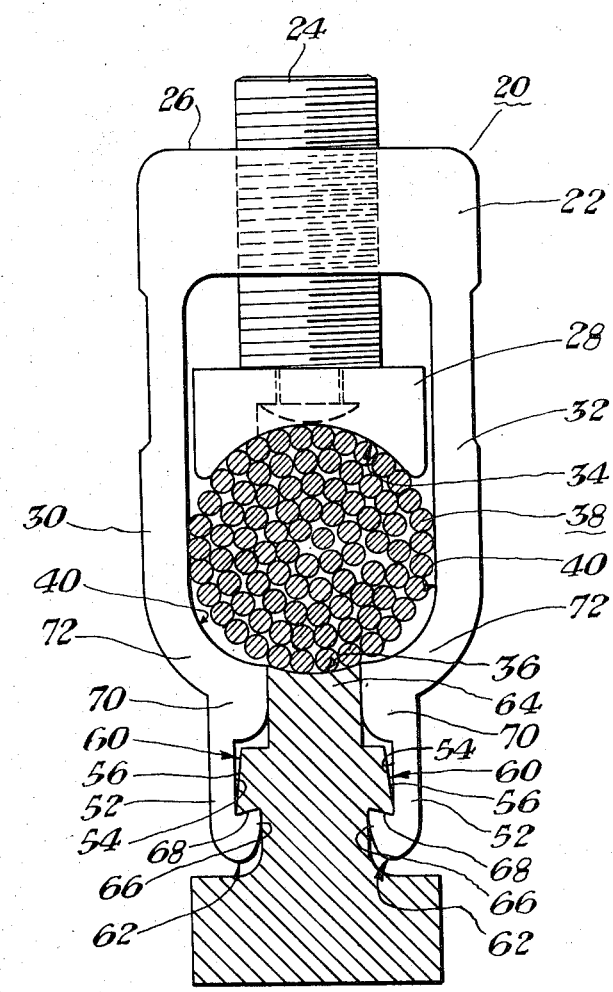
FIG. 5 is an enlarged partial cross sectional view of the apparatus of FIG. 2 and taken along reference line V—V thereof.

One arrangement of the aforementioned connector-conductor engaging means, arranged exemplarily for snap-engagement, includes the provision of depending flanges 52 secured respectively to the connector legs 30, 32 as better shown in FIGS. 4 and 5 of the drawings. Each flange 52 is provided with an inwardly facing groove 54, and lateral ribs 56 of the associated wireway conductor 18 or 18' extend into the connector grooves 54. By this means each connector 20 can be slid along the entire length of the associated conductor 18 or 18'. Moreover, the engagement between the connector grooves 54 and the conductor ribs 56 maintains each connector in an upright attitude to ensure spacing and electrical isolating the connectors 20 from one another although in side-by-side relationship. Obviously, the connector grooves 54 can be replaced with ribbed projections (not shown) cooperating with grooves (not shown) extending the length of the conductors 18 or 18' in place of their ribs 56.

Obviously, each connector 20 can be engaged and disengaged from its associated conductor 18 by slipping over the end 58 of the associated conductor 18 or 18' as better shown in FIG. 1. Desirably, however, each connector 20 is provided with the aforementioned snap-engagement feature in the event that an additional connector must be installed between previously installed connectors on a given conductor 18 or 18'. One arrangement for facilitating the aforementioned snap-engagement includes in this example inclining the outer surfaces 60 of the conductor ribs 56 upwardly and inwardly as better shown in FIGS. 1, 4 and 5 of the drawings. The inclined camming surfaces 60 cooperate with rounded or camming surfaces 62 formed in this example on the lower ends of the depending connector flanges 52. When each connector is pressed firmly downward, as viewed in the drawings, with the flanges 52 straddling the upper portion 64 of the conductor 18 or 18', the rounded camming surfaces 62 cause the flanges to spread so that their projections 66 pass over the ribs 56 and snap into place beneath them as better shown in FIGS. 4 and 5. Desirably, the upper surfaces of the projections 66 and the adjacent lower surfaces 68 of the conductor ribs are inclined upwardly and inwardly so that when force is applied to the bare cable end 38 by turning down the clamping screw 24 the legs, 30, 32 of the bug connector do not tend to spread.

The connector flanges 52 are each provided with a second projection 70 positioned for relatively close engagement with the upper projection 64 of the conductor 18 or 18' in the snap-engaged position of the connector flanges. In this position of the connector the edges of the last-mentioned projections 70 and the upper extension 64 of the conductor are substantially contingent so that sharp corners are effectively removed from the cable-engaging conductor and connector surfaces to avoid gouging of the cable end 38 when the connector clamp 28 is tightened.

Desirably, the radius of curvature of the lower leg portions 72 is shorter than the radius of the anticipated cable end 38 so that a major proportion of the clamping force applied to the cable end 38 is reactively applied to the concave surface 36 of the associated conductor 18 or 18', rather than to the lower portions of the connector. With this arrangement the tendency of the connector legs to spread is minimized and the clamping forces at the snap-engagement between the connector and the conductor are proportionately increased. Similarly, adequate direct electrical contact between the cable 38 and conductor 18 or 18' is assured. There is, moreover, no tendency for the connector to drift along the length of the conductor 18 or 18' once the connector and the bared cable end 38 are clamped thereto.

From the foregoing it will be apparent that novel and efficient forms of wireways and connector clamps have been described herein. While I have shown and described certain presently preferred embodiments of the invention and have illustrated presently preferred methods of practicing the same, it is to be distinctly understood that the invention is not limited thereto but may be variously embodied and practiced within the spirit and scope of the invention.

I claim:

1. An electrical apparatus comprising an electrically conductive wireway, at least one fixed elongated conductor, means mounting said fixed conductor in electrically isolated relationship on said wireway, a connector slidably engageable with said fixed conductor for movement therealong, means for securing a second conductor generally between said connector and said fixed conductor in electrically conductive relationship with said fixed conductor, and cooperating means formed on said connector and on said fixed conductor effecting a snap-engagement therebetween.

2. The combination according to claim 1 wherein said snap-engagement means include spaced leg members forming parts of said connector and disposed for straddling engagement with said fixed conductor.

3. The combination according to claim 2 wherein said snap-engagement means further include groove and rib means formed on said leg members and on said fixed conductor.

4. The combination according to claim 2 wherein a camming surface is disposed on at least one of said fixed conductor and said connector to facilitate said straddling and said snap-engagement.

5. The combination according to claim 1 wherein said snap-engagement means include engaging surfaces inclined in a direction to prevent separation of said connector from said fixed conductor upon application of securance forces to said second conductor when interposed between said connector and said fixed conductor.

6. The combination according to claim 1 wherein additional cooperating means are formed on said connector and said fixed conductor for keying said connector to said conductor in a given attitude to other components of said wireway for electrical isolation purposes.

7. An electrical apparatus comprising an electrically conductive wireway, at least one fixed elongated conductor, means mounting said fixed conductor in electrically isolated relationship on said wireway, a connector slidably engageable with said fixed conductor by snap-engagement with and for movement therealong, and means for securing a second conductor generally between said connector and said fixed conductor in electrically conductive relationship with at least said fixed conductor, said connector and said fixed conductor respectively having generally opposed surfaces along their respective lengths each of which is shaped complementarily for area engagement with respectively juxtaposed portions of said second conductor.

8. The combination according to claim 7 wherein adjacent portions of said fixed conductor and of said connector are provided with substantially contingent edges to obviate gouging of said second conductor.

9. The combination according to claim 7 wherein those portions of said connector adjacent said fixed conductor surfaces are displaced outwardly of the normal contour of said second conductor when inserted between said connector and said fixed conductor so as to reactively apply a major proportion of the second conductor securance forces to said fixed conductor surface in preference to said adjacent connector portions.

10. An electrical apparatus comprising an electrically conductive wireway, at least one fixed elongated conductor, means mounting said fixed conductor in electrically isolated relationship on said wireway, at least one electrically conductive connector for said fixed conductor, means for slidably and electrically engaging said connector with said fixed conductor for movement therealong, means for securing a second conductor to said connector, and cooperating means formed on said connector and said fixed conductor effecting a snap-engagement therebetween.

11. The combination according to claim 10 wherein a number of said fixed conductors are affixed to said isolating means in spaced isolation relative to one another, and at least two connectors are secured respectively to an adjacent pair of said fixed conductors, said slidable engagement positioning each of said connectors in a given attitude with respect to said fixed conductors so that said connectors cannot physically contact one another.

12. The combination according to claim 10 wherein a plurality of said fixed conductors are mounted in electrically isolated relationship upon an insulating member, a wiring trough or the like is provided for substantially enclosing said insulating member and said conductors, said insulating member being secured to a wall of said trough, said fixed conductors being so spaced from one another that a first connector when engaged with a given one of said fixed conductors, will not physically contact another connector secured to an adjacent fixed conductor at a position laterally opposed to that of said first connector.

13. An electrical apparatus comprising an electrically conductive wireway, at least one fixed elongated conductor, means mounting said fixed conductor in electrically isolated relationship on said wireway, a connector slidably engageable with said fixed conductor for movement therealong, cooperating engageable keying means formed on said fixed conductor and on said connector for positioning said connector in a given attitude with said fixed conductor for at least aiding in isolating said connector from other components of said wireway, means for applying said keying means at any point along the length of said fixed conductor, means for securing a second conductor to said connector, said second conductor securing means including means for affixing said conductor to said fixed conductor in termination of said sliding movement upon operation of said securing means.

14. The combination according to claim 13 wherein a plurality of said fixed conductors are provided together with a slidably connector similarly mounted on each of said fixed conductors, said fixed conductors and said connectors being so spaced that said keying means permits sliding passage of adjacent connectors without physical or electrical contact therebetween.

References Cited

UNITED STATES PATENTS

| | | | |
|---|---|---|---|
| 2,290,691 | 7/1942 | Lemont | 339—244(B) |
| 3,210,716 | 10/1965 | Meacham | 339—21 |
| 3,335,399 | 8/1967 | Rys | 339—272(U)X |

FOREIGN PATENTS

| | | | |
|---|---|---|---|
| 888,909 | 9/1943 | France | 339—272(U) |

MARVIN A. CHAMPION, Primary Examiner

P. A. CLIFFORD, Assistant Examiner

U.S. Cl. X.R.

339—244, 272